United States Patent
Daga et al.

(10) Patent No.: US 12,282,680 B2
(45) Date of Patent: Apr. 22, 2025

(54) SYSTEM AND METHOD FOR MANAGING SORTED KEYS IN A PERSISTENT MEMORY SYSTEM

(71) Applicant: Samsung Electronics Co., Ltd., Suwon-si (KR)

(72) Inventors: Vinod Daga, Santa Clara, CA (US); Angel Benedicto Aviles, Jr., San Jose, CA (US); Shwetha Handral Sridhara, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 37 days.

(21) Appl. No.: 18/333,520

(22) Filed: Jun. 12, 2023

(65) Prior Publication Data

US 2024/0281165 A1    Aug. 22, 2024

Related U.S. Application Data

(60) Provisional application No. 63/447,188, filed on Feb. 21, 2023.

(51) Int. Cl.
*G06F 3/06* (2006.01)

(52) U.S. Cl.
CPC .......... *G06F 3/0652* (2013.01); *G06F 3/0607* (2013.01); *G06F 3/0679* (2013.01)

(58) Field of Classification Search
CPC .... G06F 3/0652; G06F 3/0607; G06F 3/0679; G06F 16/2228; G06F 16/28; G06F 16/137; G06F 12/0292; G06F 3/0614; G06F 16/1805; G06F 16/2255; G06F 2212/1032
See application file for complete search history.

(56) References Cited

U.S. PATENT DOCUMENTS

| | | | |
|---|---|---|---|
| 8,285,925 B1 | 10/2012 | Sorenson, III et al. | |
| 8,650,156 B1 | 2/2014 | McHugh et al. | |
| 9,448,924 B2 | 9/2016 | Sundaram et al. | |
| 11,397,545 B1 | 7/2022 | Hamid et al. | |
| 11,436,163 B2 | 9/2022 | McHugh et al. | |
| 11,481,372 B1* | 10/2022 | Neganov | G06F 16/2272 |
| 2002/0099691 A1 | 7/2002 | Lore et al. | |
| 2017/0212680 A1 | 7/2017 | Waghulde | |
| 2018/0011893 A1* | 1/2018 | Kimura | G06F 16/283 |
| 2021/0191839 A1* | 6/2021 | Ozawa | G06F 11/3476 |
| 2022/0011948 A1* | 1/2022 | Kang | G06F 3/0638 |
| 2022/0171747 A1* | 6/2022 | Rajyaguru | G06F 16/212 |
| 2022/0335027 A1 | 10/2022 | Subramanian Seshadri et al. | |

FOREIGN PATENT DOCUMENTS

EP    3937000 A1    1/2022

OTHER PUBLICATIONS

EPO Extended European Search Report dated Jun. 17, 2024, issued in corresponding European Patent Application No. 24152107.9, 9 pages.

* cited by examiner

*Primary Examiner* — Jason W Blust
(74) *Attorney, Agent, or Firm* — Lewis Roca Rothgerber Christie LLP

(57) ABSTRACT

A system and method for system and method for managing sorted keys in a persistent memory system. In some embodiments, the method includes adding a key to a sorted set of keys. The adding may include: identifying a bin, in a key map, corresponding to the key; and adding the key to a subset of keys associated with the bin, the subset of keys being stored in persistent memory.

16 Claims, 8 Drawing Sheets

SYSTEM AND METHOD FOR MANAGING SORTED KEYS IN A PERSISTENT MEMORY SYSTEM

CROSS-REFERENCE TO RELATED APPLICATION(S)

The present application claims priority to and the benefit of U.S. Provisional Application No. 63/447,188, filed Feb. 21, 2023, entitled "METHOD OF SORTING KEYS ON STORAGE", the entire content of which is incorporated herein by reference.

FIELD

One or more aspects of embodiments according to the present disclosure relate to data storage, and more particularly to a system and method for managing sorted keys in a persistent memory system.

BACKGROUND

In storage systems, keys may on occasion be stored, with, for example, each key being associated with a respective value. The keys may be stored according to a hash function, or, in some embodiments, in order.

It is with respect to this general technical environment that aspects of the present disclosure are related.

SUMMARY

According to an embodiment of the present disclosure, there is provided a method, including: adding a key to a sorted set of keys, the adding including: identifying a bin, in a key map, corresponding to the key; and adding the key to a subset of keys associated with the bin, the subset of keys being stored in persistent memory.

In some embodiments, the adding of the key to the subset of keys associated with the bin includes adding an operation to a journal associated with the bin, the journal including one or more operations and one or more keys, each key being associated with a respective operation.

In some embodiments, the adding of the key to the subset of keys associated with the bin further includes adding to the journal a value pointer identifying a location of a stored value associated with the key.

In some embodiments, a first portion of the journal is sorted by key.

In some embodiments, a second portion of the journal is in chronological order.

In some embodiments, the method further includes sorting the first portion and the second portion by key.

In some embodiments, the method further includes: dividing the bin into two bins.

In some embodiments: the dividing of the bin into two bins includes: determining that the number of keys in the subset exceeds a threshold; and in response to determining that the number of keys in the subset exceeds the threshold, dividing the bin into two bins.

In some embodiments: the bin is at a first level in a multi-level data structure; and the dividing of the bin into two bins includes: dividing the bin into two bins, each of the two bins being at a second level in the multi-level data structure.

In some embodiments, the method further includes: deleting the key.

In some embodiments: the adding of the key to the subset of keys associated with the bin includes adding a first operation to a journal associated with the bin, the journal including one or more operations and one or more keys, each key being associated with a respective operation; and the deleting of the key includes replacing, in the journal associated with the bin, the first operation with a second operation, the second operation indicating the deletion of the key.

In some embodiments: the adding of the key includes adding the key by a host, the host being connected to a persistent storage device; and the persistent storage is persistent storage of the host.

In some embodiments: the host includes a non-volatile dual in-line memory module; and the persistent storage is within the non-volatile dual in-line memory module.

In some embodiments: the adding of the key includes adding the key by a host, the host being connected to a persistent storage device; and the persistent storage is persistent storage of the persistent storage device.

According to an embodiment of the present disclosure, there is provided a system, including: a processing circuit; and memory, operatively connected to the processing circuit and storing instructions that, when executed by the processing circuit, cause the system to perform a method, the method including: adding a key to a sorted set of keys, the adding including: identifying a bin, in a key map, corresponding to the key; and adding the key to a subset of keys associated with the bin, the subset of keys being stored in persistent memory.

In some embodiments, the adding of the key to the subset of keys associated with the bin includes adding an operation to a journal associated with the bin, the journal including one or more operations and one or more keys, each key being associated with a respective operation.

In some embodiments, the adding of the key to the subset of keys associated with the bin further includes adding to the journal a value pointer identifying a location of a stored value associated with the key.

In some embodiments, a first portion of the journal is sorted by key.

In some embodiments, a second portion of the journal is in chronological order.

According to an embodiment of the present disclosure, there is provided a system, including: means for processing; and memory, operatively connected to the means for processing and storing instructions that, when executed by the means for processing, cause the system to perform a method, the method including: adding a key to a sorted set of keys, the adding including: identifying a bin, in a key map, corresponding to the key; and adding the key to a subset of keys associated with the bin, the subset of keys being stored in persistent memory.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1:
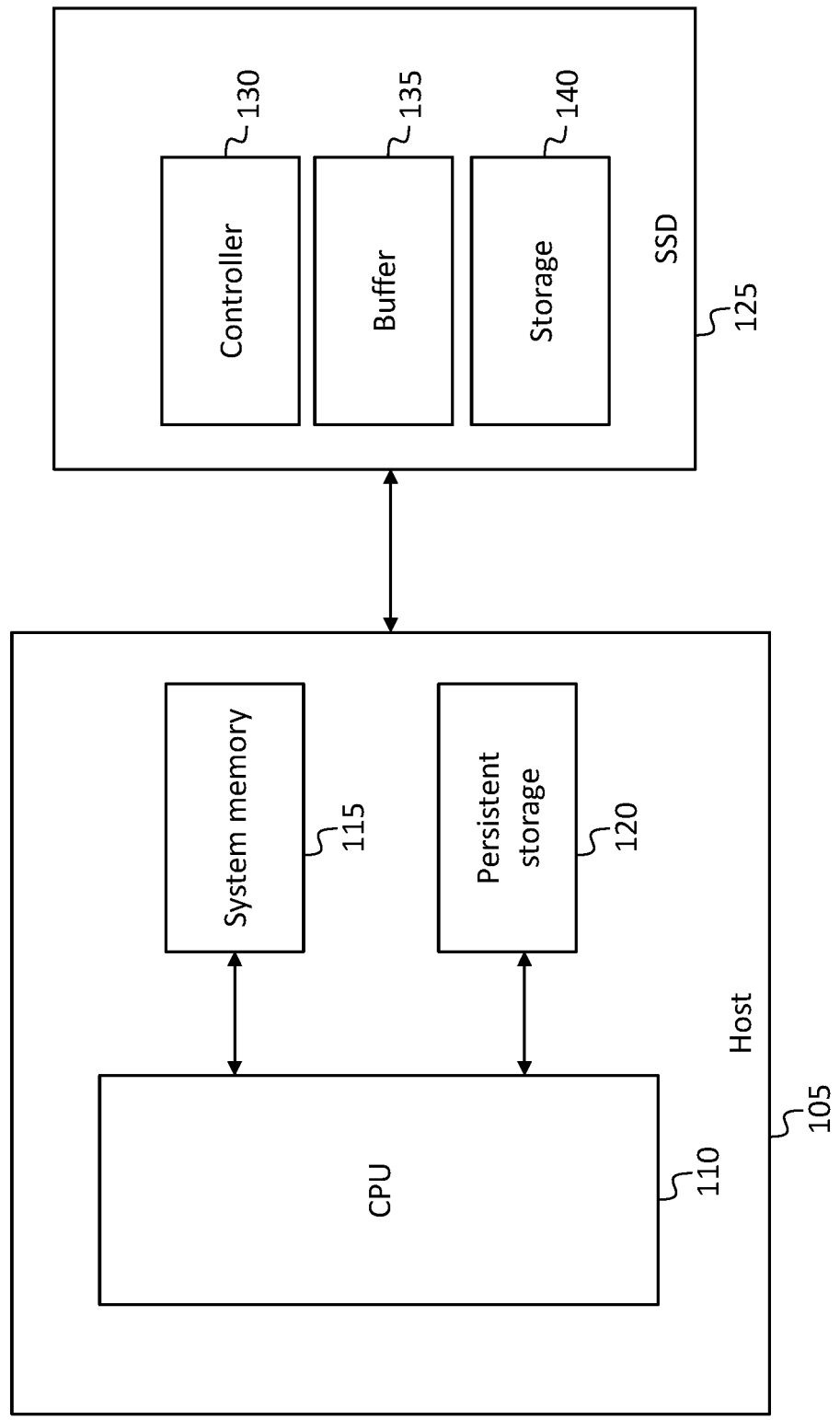
FIG. 1 is a system block diagram, according to an embodiment of the present disclosure.

The detailed description set forth below in connection with the appended drawings is intended as a description of exemplary embodiments of a system and method for managing sorted keys in a persistent memory system provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Key value stores are used in various applications, enabling efficient retrieval of data (e.g., a value) identified by an identifier (a key). Each key may be a moderate-sized number (e.g., a number having a size of between 64 bits and 512 bits) and each value may be of substantially arbitrary size, having, for example, a size of between 1 kilobyte and 10 terabytes. Keys and values may be stored together in persistent storage, e.g., in a persistent memory system. In some embodiments, keys are stored in locations, in the persistent storage, identified by a hash function. Each key may be stored with a value pointer identifying a location of a stored value associated with the key. In other embodiments, the keys may be stored in order (or "sorted"), e.g., from smallest to largest or from largest to smallest. In such an embodiment each key may also be stored with a value pointer identifying a location of a stored value associated with the key.

When the keys are stored in order, maintaining an ordered list of keys may be burdensome. For example, adding (or "inserting") a new key near the middle of the set of ordered keys may involve moving all of the keys smaller than the key being added or moving all of the keys larger than the key being added to make room for the key being added. In some persistent storage devices such as solid-state drives (SSDs), it may not be feasible to overwrite values written to the storage media (e.g., to persistent storage media of the persistent storage device), because the smallest unit of media capable of being erased in one operation (which may be referred to as a block), may be relatively large. As such, in such a persistent storage device, when the ordered key list is updated, the entire list may be marked invalid in the persistent storage device, and the entire updated list, including the key being added, may be written to a new location in the persistent storage device. This process may result in significant write amplification, e.g., in writing a significantly larger amount of data than the key being added.

As such, in some embodiments, the range of possible key values is divided into sub-ranges referred to herein as "bins". A separate ordered list of keys may be maintained in the persistent storage device for each bin, and a buffer (of a plurality of buffers, each corresponding to a respective bin), which is separate from the ordered key list, may be used to store operations to be performed on keys (such as adding, or deleting a key) within the bin. When a key is to be added (e.g., in response to a command sent, or a function call made, by an application running on a host connected to the persistent storage), the add operation is initially stored in the buffer. Periodically the buffer may be flushed to the ordered key list stored in the persistent storage device.

The operations may be stored in the buffer in order by key, or a first portion of the operations in the buffer may be stored in order by key in a first portion of the buffer, and a second portion of the operations may be stored, in a second portion of the buffer, in chronological order. Periodically, the entire buffer may be sorted, so that, until the next operation is added, the operations in the entire buffer are stored in order by key. When an new operation for a key is received, the buffer is first searched for other operations already stored for the key; if such an operation is present, then the previously stored operation in the buffer may be replaced by the newly received operation. For example, if an add operation is received and stored in the buffer, and subsequently a delete operation is received for the same key, then the system may overwrite the add operation with the delete operation.

In some embodiments, the buffer is implemented in nonvolatile memory in the host (not in the persistent storage device). For example, the buffer may be implemented in one or more non-volatile dual in-line memory modules (NVDIMMs) or in battery-backed random-access memory (e.g., battery-backed dynamic random-access memory). The use of a plurality of buffers, each corresponding to a respective bin, to buffer operations (or "key operations") may significantly reduce write amplification in the persistent storage device compared to a method involving updating the ordered key list in the persistent storage device for each key operation.

FIG. 1 is a block diagram of a portion of a computing system, in some embodiments. The computing system may include a host 105 including a central processing unit (CPU) 110, a system memory 115 (which may be or include dynamic random-access memory (DRAM)), and persistent storage 120 (which may be or include one or more non-volatile dual in-line memory modules (NVDIMMs)). The host 105 may also be connected to (or, in some embodiments, include) one or more persistent storage devices 125 (e.g., solid state drives (SSDs), which may include a controller 130 (which may be a processing circuit such as a microcontroller)), a memory (e.g., a dynamic random-access memory (DRAM) memory) 135, and persistent storage 140 (e.g., flash media), connected to the controller 130. In operation, the central processing unit 110 of the host 105 may read and execute instructions from the system memory 115, and, in accordance with such instructions, the central processing unit 110 of the host 105 may on occasion send commands to the persistent storage device 125, e.g., commands instructing the persistent storage device 125 to save data or to retrieve data for the host 105. The controller 130 of the persistent storage device 125 may, in response to such commands, perform write or read operations in the persistent storage 140 of the persistent storage device 125, using the memory 135 of the persistent storage device 125 as needed for temporary storage for such operations.

Figure 2:
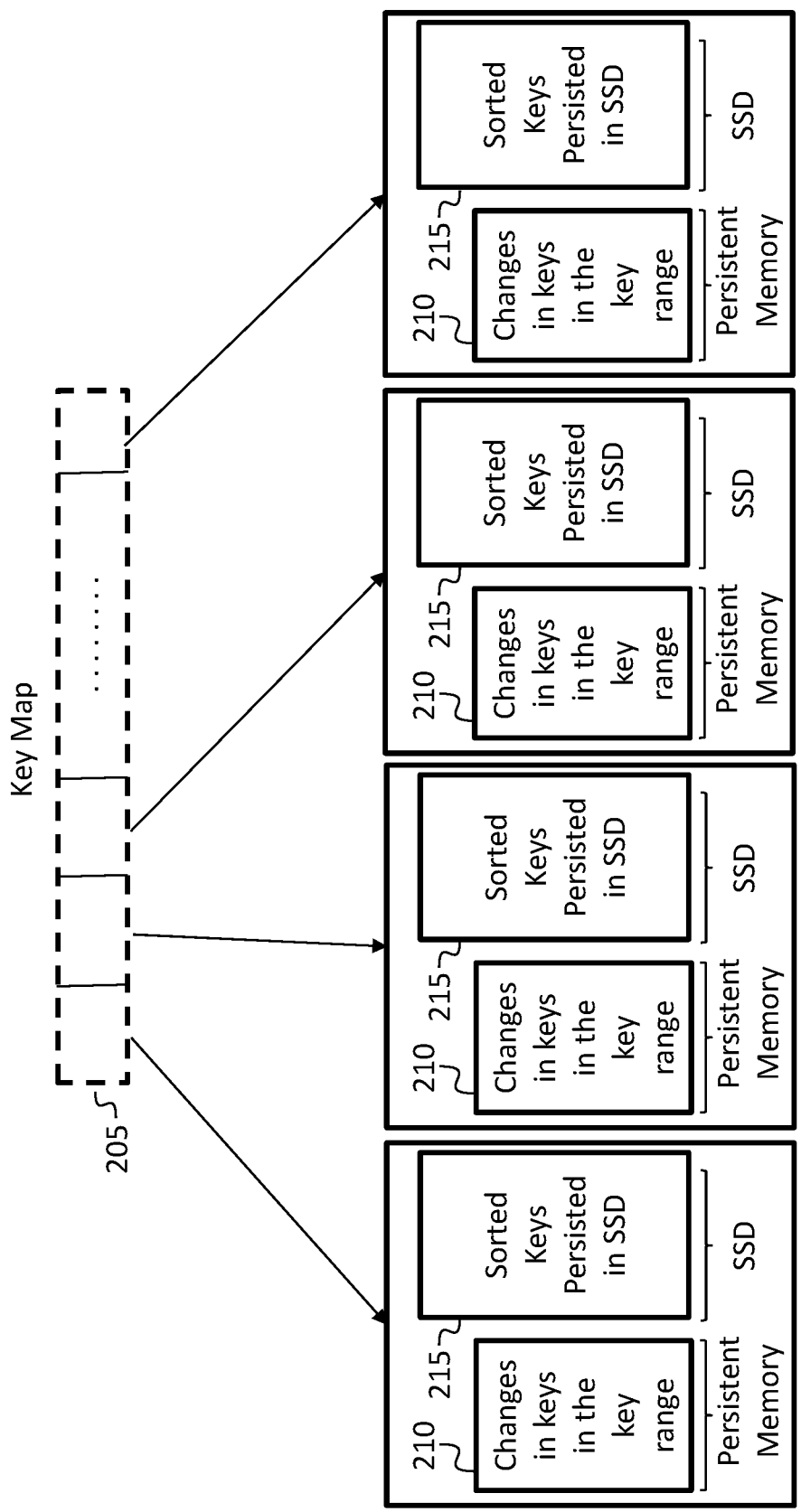
FIG. 2 is a data organization diagram, according to an embodiment of the present disclosure.

FIG. 2 shows a data configuration, in some embodiments. As mentioned above, when keys are to be stored in order, the range of possible key values may be divided into sub-ranges referred to herein as bins, defined by a key map 205, each associated with a respective buffer 210 and with a respective ordered key list 215. Each bin may correspond to a subset of the stored keys (the subset including the keys that fall within the bin). For each bin an ordered key list 215 may be stored in the persistent storage device 125 (e.g., a set of sorted keys may be persisted in the persistent storage device 125). In the ordered key list 215, each key may be stored along with a value pointer identifying a location of a stored value associated with the key. The buffers 210 may be implemented, for example, in persistent storage 120 of the host 105 (e.g., in one or more non-volatile dual in-line memory modules (NVDIMMs) in the host 105), or in battery-backed random-access memory (e.g., battery-backed dynamic random-access memory), or in the persistent storage 140 of the persistent storage device 125. The key map 205 may be stored in the persistent storage 120 of the host 105 or in the persistent storage 140 of the persistent storage device 125.

When a key operation is received, the system memory 115 of the host 105 may determine which bin the key is in, identify the corresponding buffer 210, and save the key operation in the buffer 210 (which may, accordingly, store a set of changes in the keys in the key range corresponding to the bin). The buffer may operate as a journal, by storing a set of operations to be performed; adding an operation to the buffer may have the effect of adding the operation to the journal. As used herein, a key operation being "received" means that a determination is made (e.g., as a result of a command sent by, or a function call made by an application running on the host 105) that the operation is to be performed. For example, if an application running on the host 105 makes a function call requesting that a key value pair be saved in persistent storage, then the called function may first save the value in the persistent storage device 125, obtaining, in the process, a value pointer identifying the location of the stored value, and the called function may then send, to an application programming interface (API) in the host 105 a request that the key be added. This may result in the key operation being "received", as this term is used herein.

Each key operation may include (i) the key, (ii) an identifier for the operation (e.g., add or delete or modify) to be performed, and (iii) a value pointer identifying the location of the stored value associated with the key. If the operation is an add operation, the host 105 may (i) determine, from the key map 205, which buffer 210 corresponds to the key, (ii) check that the key is not already stored, and, if it is not already stored, (iii) store an add operation for the key in the buffer 210. The key map 205 may be or include a list of bin boundaries, each pair of adjacent boundaries bracketing a respective bin and being associated with a buffer identifier. To identify the buffer 210 corresponding to a given key, the host 105 may search (e.g., using a binary search) for a pair of boundaries bracketing the key, and look up a buffer identifier (e.g., a pointer to a buffer 210) corresponding to the pair of boundaries.

To determine whether the key is already stored, the host 105 may search both the ordered key list 215 in the persistent storage device 125 and the buffer 210 for the key. In some embodiments, the searching may be avoided by the use of a Bloom filter, which may be updated each time a key is added or deleted. This Bloom filter may be able to indicate with certainty that the key is absent from the ordered key list 215 in the persistent storage device 125 and from the buffer 210, or it may return an uncertain result, tentatively indicating that the key is likely present. If the Bloom filter indicates that the key is likely present, the host 105 may perform a search, in the persistent storage device 125 and in the buffer 210, to determine whether the key is in fact present. In some embodiments, two Bloom filters may be maintained for each bin, one for determining whether a given key is in the buffer 210 corresponding to the key, and one for determining whether the key is in the ordered list corresponding to the bin containing the key, in the persistent storage device 125. If an add operation is received for a key that is already stored, the host 105 may generate an exception, notifying the requesting application that it has made a request to store a duplicate key.

A key may be updated with a new value when an update operation is received. For example, an application may request that an already-stored key be associated with a new value, different from the value previously stored for the key. In response to such a request, the host 105 may first (i) delete the previously saved value from the persistent storage device 125 and (ii) save the new value in the persistent storage device 125, obtaining, in the process, a value pointer identifying the location of the new stored value. The host may then generate an update operation including the key and the value pointer identifying the location of the new stored value. To update a key, in response to an update operation, the host 105 may (i) determine, from the key map 205, which buffer 210 corresponds to the key, (ii) check that the key is already stored, and, if it is already stored, (iii) store an update operation (including the key and the value pointer identifying the location of the new stored value) for the key in the buffer 210. The determining of which buffer 210 corresponds to the key may be done in the same manner as for an add operation (discussed above).

To check that the key is already stored, the host 105 may first check the Bloom filter; if the Bloom filter indicates that the key is absent (e.g., the key is absent from the ordered key list 215 in the persistent storage device 125 and the buffer 210 does not contain an add operation for the key, or the buffer 210 contains a delete operation for the key) then the host 105 may generate an exception, notifying the requesting application that it has made a request to delete a nonexistent key. If the Bloom filter produces a tentative indication that the key is present, the host 105 may search the persistent storage device 125 and the buffer 210, and, if the key is not in fact present, the host 105 may generate an exception, notifying the requesting application that it has made a request to delete a nonexistent key. If the host 105 determines, when processing an update operation, that an add operation is already in the buffer 210, it may, instead of adding the update operation to the buffer 210 as a new operation, modify the add operation to include (instead of the value pointer identifying the location of the previously stored value associated with the key), the value pointer identifying the location of the new stored value associated with the key.

To delete a key, the host 105 may (i) determine, from the key map 205, which buffer 210 corresponds to the key, (ii) check that the key is already stored, and, if it is already stored, (iii) store a delete operation for the key in the buffer 210. The determining of which buffer 210 corresponds to the key may be done in the same manner as for an add operation (discussed above). To check that the key is already stored, the host 105 may first check the Bloom filter; if the Bloom filter indicates that the key is absent then the host 105 may generate an exception, notifying the requesting application that it has made a request to delete a nonexistent key. If the Bloom filter produces a tentative indication that the key is present, the host 105 may search the persistent storage device 125 and the buffer 210, and, if the key is not present, the host 105 may generate an exception, notifying the requesting application that it has made a request to delete a nonexistent key. If the host 105 determines, while processing a delete command, that the buffer 210 already contains an add operation or an update operation for the key, it may, instead of adding the delete operation to the buffer 210 as a new operation, replace the add or update operation with the delete operation.

The system may also support lookup operations (which search for a given key), range erase, and range query operations. To perform a lookup operation for a key, the host 105 may first check the buffer 210 corresponding to the bin containing the key. If an add or update operation for the key is present in the buffer 210, the host 105 may return the value pointer, of the add or update operation, identifying the location of the stored value associated with the key. If a delete operation for the key is present in the buffer 210, the host 105 may return a response indicating that the key is not present. If no operations for the key are present in the buffer 210, the host 105 may search the ordered key list 215 in the persistent storage device 125 for the key and return (i) the value pointer, stored with the key, identifying the location of the stored value associated with the key, if the key is present, or (ii) a response indicating that the key is not present, otherwise.

To perform a range erase operation, the host 105 may, for each ordered key list 215 corresponding to a bin overlapping with a portion of the range, read the ordered key list 215 into system memory 115 of the host 105, update it according to all of the operations in the buffer 210, delete the keys in the range, and then write the updated ordered list back to the persistent storage device 125. To perform a range query operation, the host 105 may, for each ordered key list 215 corresponding to a bin overlapping with a portion of the range, read the ordered key list 215 into system memory 115 of the host 105, update it according to all of the operations in the buffer 210, and perform the query on the data in the system memory 115 of the host 105. After the query is performed, the host 105 may flush the buffer 210, e.g., write the updated ordered key list 215 back to the persistent storage device 125. Performing a flush after a range query may be less costly than at other times because after the range query is completed the ordered key list 215 will already have been read into the system memory 115 of the host 105 and updated according to the key operations in the buffer 210.

When a key operation is added to a buffer 210, the size of the unsorted portion of the buffer 210 may be checked, and, if it has exceeded a first threshold, the entire buffer 210 may be sorted, according to the keys of the operations in the buffer 210. The total size of the buffer 210 may also be checked, and if it has exceeded a second threshold, then the buffer 210 may be flushed to the persistent storage device 125 (e.g., the corresponding ordered key list 215 may be read from the persistent storage device 125 into the system memory 115 of the host 105 and updated with all of the operations in the buffer 210, and the updated ordered key list 215 may again be stored in the persistent storage device 125). The total number of keys in the bin (both in the persistent storage device 125 and in the buffer 210) may also be compared, to a third threshold; if the total number of keys exceeds the third threshold, the bin may be split (as discussed in further detail below).

Figure 3A:
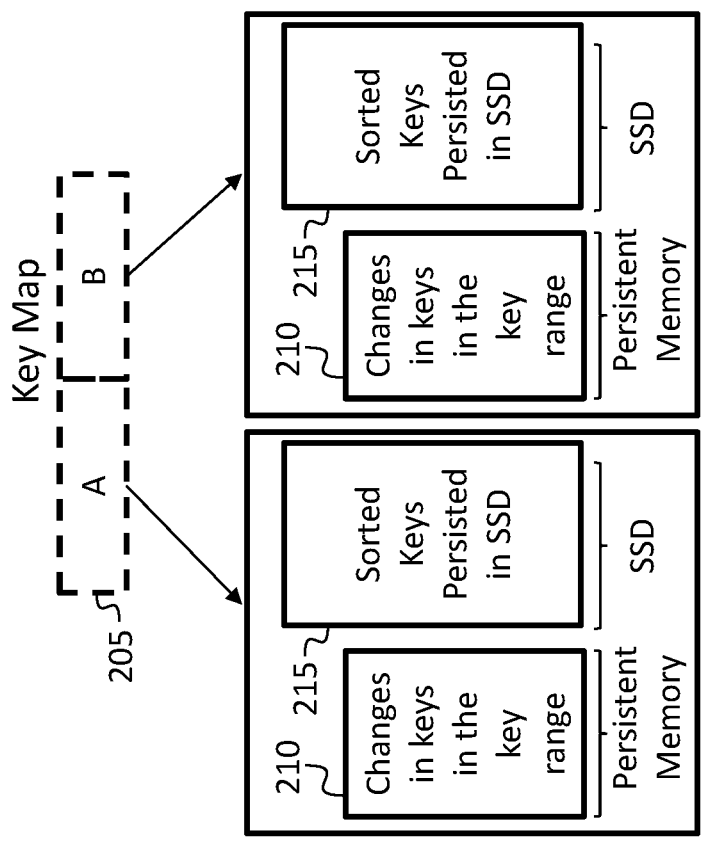
FIG. 3A is a data organization diagram, according to an embodiment of the present disclosure.
Figure 3B:
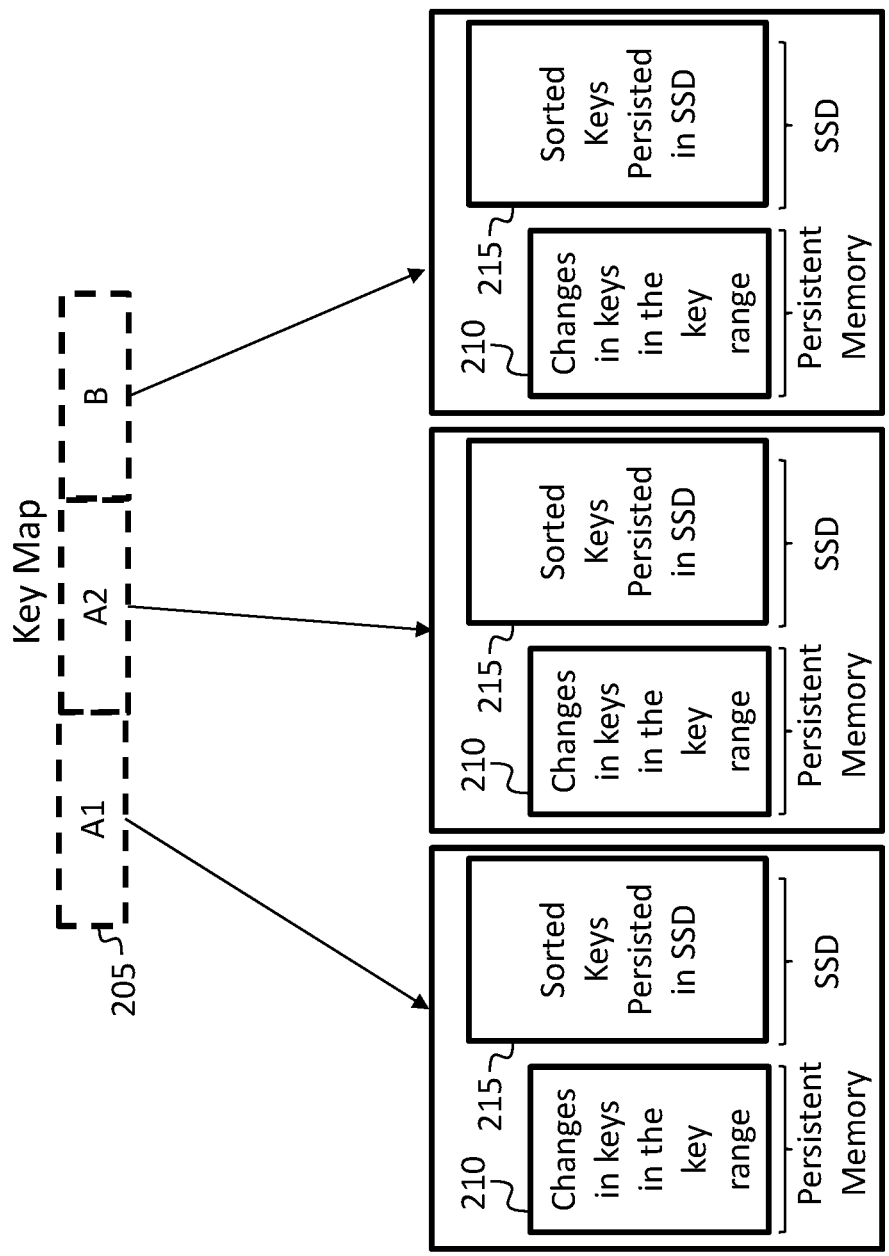
FIG. 3B is a data organization diagram, according to an embodiment of the present disclosure.

FIGS. 3A and 3B illustrate bin splitting, in some embodiments. In FIG. 3A, a number of keys has been added to the bin labeled A in the key map 205 and the total number of keys in the bin has exceeded the third threshold. As such, the host 105 (i) flushes the operations from the buffer 210 corresponding to the bin labeled A to the persistent storage device 125 and (ii) inserts a new boundary into the key map 205 within the bin labeled A, so that this bin becomes two bins, labeled A1 and A2 in FIG. 3B. Immediately after the split, both of the buffers 210 of the two bins, labeled A1 and A2 may be empty, as a result of the flush performed by the host 105 prior to the split.

Figure 3C:
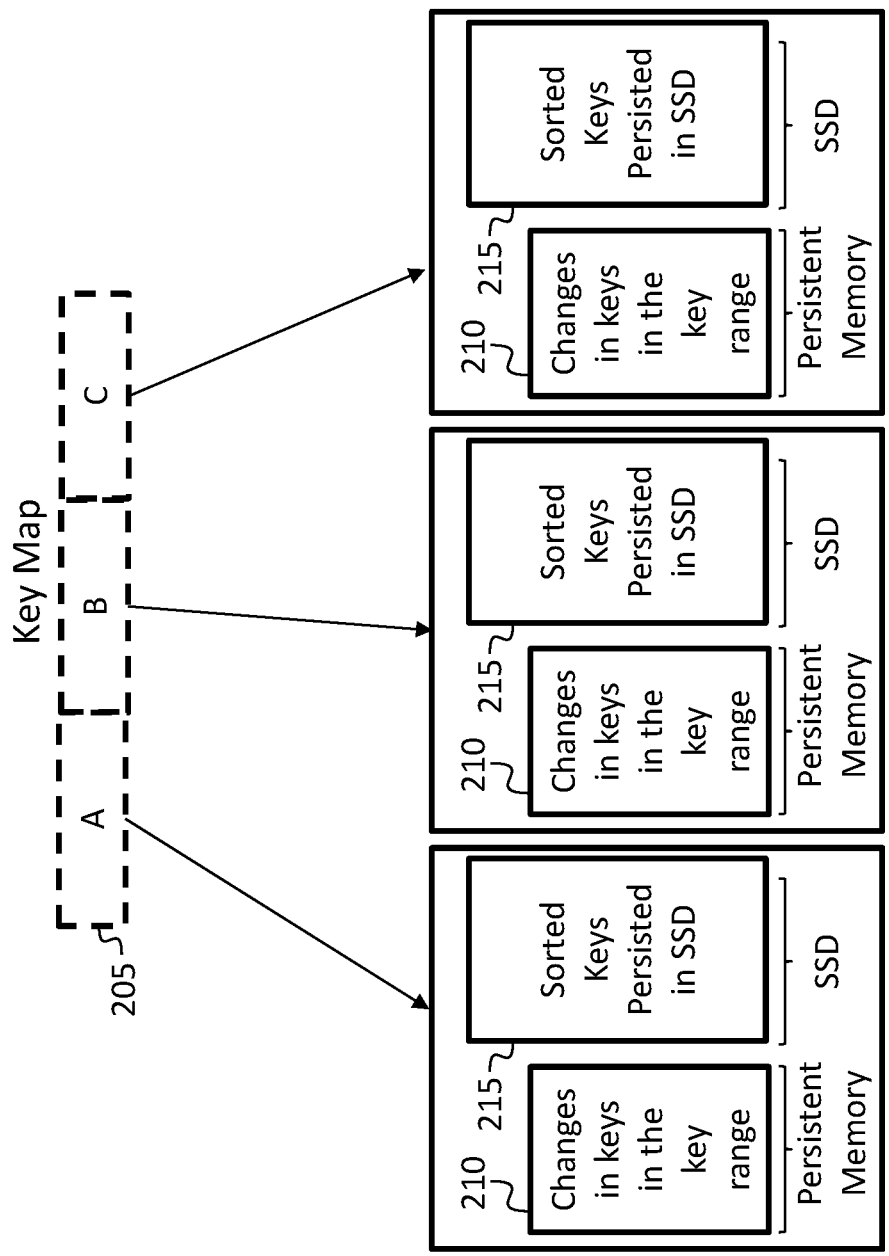
FIG. 3C is a data organization diagram, according to an embodiment of the present disclosure.
Figure 3D:
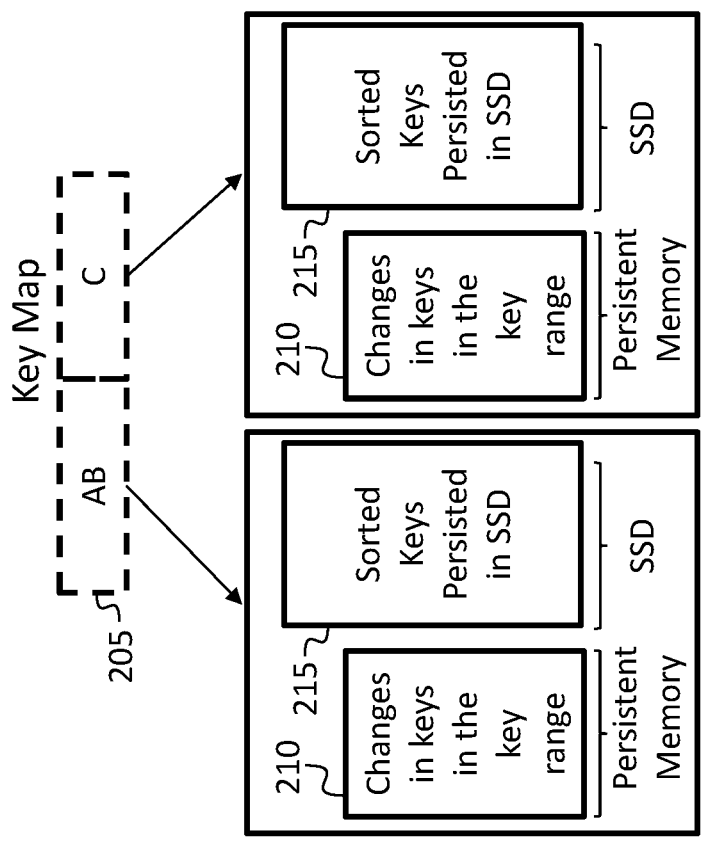
FIG. 3D is a data organization diagram, according to an embodiment of the present disclosure.

FIGS. 3C and 3D illustrate bin merging, in some embodiments. In FIG. 3C, a number of keys has been deleted from one or the other or both of the bins labeled A and B in the key map 205, so that the total number of keys in these two bins has fallen below the third threshold (in some embodiments, merging does not occur until the number falls below a fourth threshold, less than the third threshold). The host 105 may then (i) flush the operations from the buffers 210 corresponding to the bins labeled A and B to the persistent storage device 125 and (ii) delete the boundary between A and B from the key map 205, so that these two bins become one bin, labeled AB in FIG. 3D. Immediately after the split, the buffer 210 of the bin labeled AB may be empty, as a result of the flush performed by the host 105 prior to the split.

Figure 4:
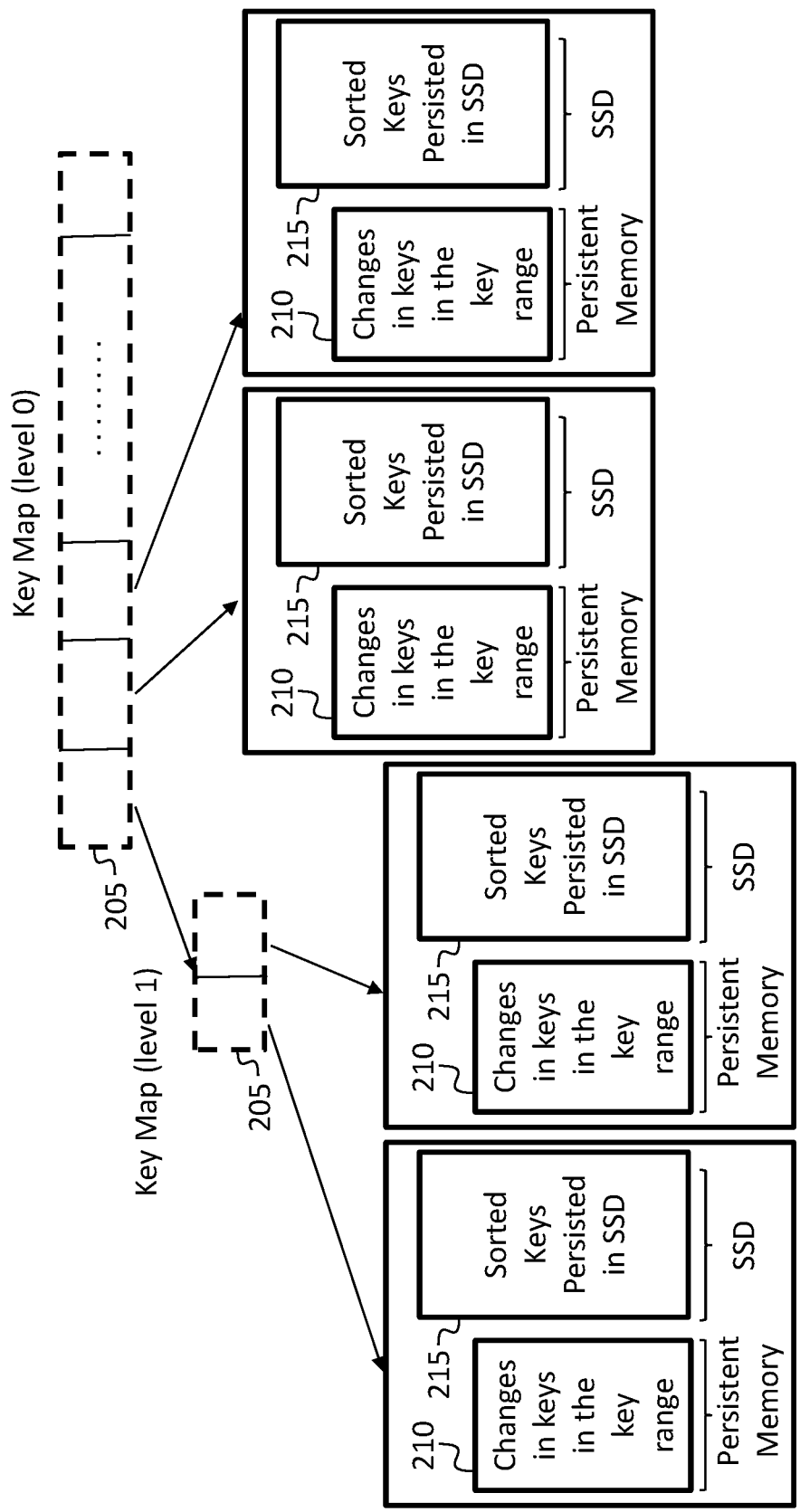
FIG. 4 is a data organization diagram, according to an embodiment of the present disclosure.

In some embodiments, the key map 205 may be, or may, upon the addition of a sufficient number of keys, become, a multi-level tree as illustrated in FIG. 4. In the configuration of FIG. 4, the left-most bin of the level 0 key map 205 corresponds to a level 1 key map 205, which includes two bins that (i) together span the same range of keys as the left most level 0 bin, and (ii) each of which corresponds to a respective buffer 210 and a respective ordered key list 215. The two bins of the level 1 key map may be created, for example, as the result of a splitting operation, in which (i) it is determined that the left-most bin of the level 0 key map 205 is too full, and the left-most bin of the level 0 key map 205 is replaced with the two bins of the level 1 key map.

Figure 5:
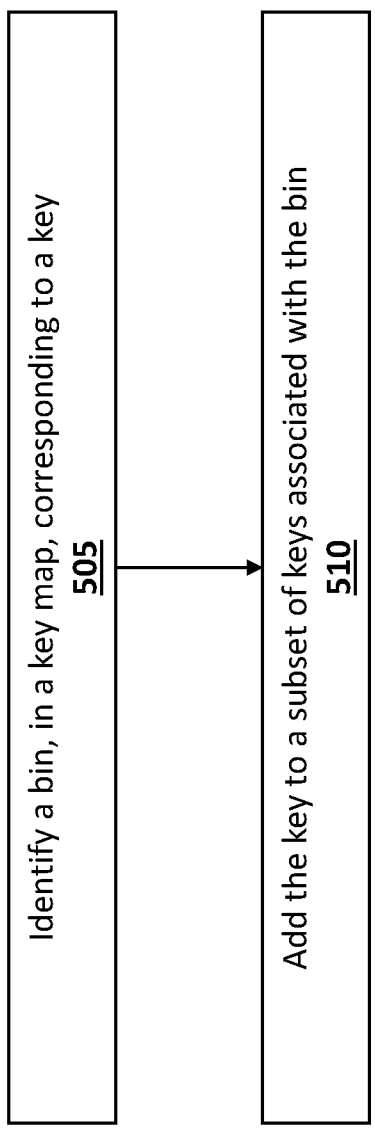
FIG. 5 is a flow chart, according to an embodiment of the present disclosure.

FIG. 5 is a flow chart, showing a method for adding a key to a sorted set of keys, in some embodiments. The method includes, at 505, identifying a bin, in a key map 205, corresponding to the key; and adding, at 510, the key to a subset of keys associated with the bin. The subset of keys may be stored in a persistent memory system (e.g., in persistent storage 120 of the host 105, or in persistent storage 140 of the persistent storage device 125).

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., $(1-35/100)$ times 10) and the recited maximum value of 13.5 (i.e., $(1+35/100)$ times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Some embodiments may include features of the following numbered statements.

1. A method, comprising:
   adding a key to a sorted set of keys, the adding comprising:
   identifying a bin, in a key map, corresponding to the key; and
   adding the key to a subset of keys associated with the bin, the subset of keys being stored in persistent memory.

2. The method of statement 1, wherein the adding of the key to the subset of keys associated with the bin comprises adding an operation to a journal associated with the bin, the journal including one or more operations and one or more keys, each key being associated with a respective operation.

3. The method of statement 2, wherein the adding of the key to the subset of keys associated with the bin further comprises adding to the journal a value pointer identifying a location of a stored value associated with the key.

4. The method of statement 2 or statement 3, wherein a first portion of the journal is sorted by key.

5. The method of any one of statements 2 to 4, wherein a second portion of the journal is in chronological order.

6. The method of statement 5, further comprising sorting the first portion and the second portion by key.

7. The method of any one of the preceding statements, further comprising:
   dividing the bin into two bins.

8. The method of statement 7, wherein:
   the dividing of the bin into two bins comprises:
     determining that the number of keys in the subset exceeds a threshold; and
     in response to determining that the number of keys in the subset exceeds the threshold, dividing the bin into two bins.

9. The method of statement 7 or statement 8, wherein:
   the bin is at a first level in a multi-level data structure; and
   the dividing of the bin into two bins comprises:
     dividing the bin into two bins, each of the two bins being at a second level in the multi-level data structure.

10. The method of any one of the preceding statements, further comprising:
    deleting the key.

11. The method of statement 10, wherein:
    the adding of the key to the subset of keys associated with the bin comprises adding a first operation to a journal associated with the bin, the journal including one or more operations and one or more keys, each key being associated with a respective operation; and the deleting of the key comprises replacing, in the journal associated with the bin, the first operation with a second operation, the second operation indicating the deletion of the key.

12. The method of any one of the preceding statements, wherein:
the adding of the key comprises adding the key by a host, the host being connected to a persistent storage device; and
the persistent storage is persistent storage of the host.

13. The method of statement 12, wherein:
the host comprises a non-volatile dual in-line memory module; and
the persistent storage is within the non-volatile dual in-line memory module.

14. The method of statement 1, wherein:
the adding of the key comprises adding the key by a host, the host being connected to a persistent storage device; and
the persistent storage is persistent storage of the persistent storage device.

15. A system, comprising:
a processing circuit; and
memory, operatively connected to the processing circuit and storing instructions that, when executed by the processing circuit, cause the system to perform a method, the method comprising:
adding a key to a sorted set of keys,
the adding comprising:
identifying a bin, in a key map, corresponding to the key; and
adding the key to a subset of keys associated with the bin,
the subset of keys being stored in persistent memory.

16. The system of statement 15, wherein the adding of the key to the subset of keys associated with the bin comprises adding an operation to a journal associated with the bin, the journal including one or more operations and one or more keys, each key being associated with a respective operation.

17. The system of statement 15 or statement 16, wherein the adding of the key to the subset of keys associated with the bin further comprises adding to the journal a value pointer identifying a location of a stored value associated with the key.

18. The system of any one of statements 15 to 17, wherein a first portion of the journal is sorted by key.

19. The system of any one of statements 15 to 18, wherein a second portion of the journal is in chronological order.

20. A system, comprising:
means for processing; and
memory, operatively connected to the means for processing and storing instructions that, when executed by the means for processing, cause the system to perform a method, the method comprising:
adding a key to a sorted set of keys,
the adding comprising:
identifying a bin, in a key map, corresponding to the key; and
adding the key to a subset of keys associated with the bin, the subset of keys being stored in persistent memory.

Although exemplary embodiments of a system and method for managing sorted keys in a persistent memory system have been specifically described and illustrated herein, many modifications and variations will be apparent to those skilled in the art. Accordingly, it is to be understood that a system and method for managing sorted keys in a persistent memory system constructed according to principles of this disclosure may be embodied other than as specifically described herein. The invention is also defined in the following claims, and equivalents thereof.

What is claimed is:

1. A method, comprising:
adding a key to a sorted set of keys, the adding comprising:
identifying a bin, in a key map, corresponding to the key;
adding the key to a subset of keys associated with the bin, the subset of keys being stored in persistent memory, and
deleting the key,
wherein:
the adding of the key to the subset of keys associated with the bin comprises adding a first operation to a journal associated with the bin, the journal including one or more operations and one or more keys, each key being associated with a respective operation; and
the deleting of the key comprises replacing, in the journal associated with the bin, the first operation with a second operation, the second operation indicating the deletion of the key.

2. The method of claim 1, wherein the adding of the key to the subset of keys associated with the bin further comprises adding to the journal a value pointer identifying a location of a stored value associated with the key.

3. The method of claim 1, wherein a first portion of the journal is sorted by key.

4. The method of claim 3, wherein a second portion of the journal is in chronological order.

5. The method of claim 4, further comprising sorting the first portion and the second portion by key.

6. The method of claim 1, further comprising:
dividing the bin into two bins.

7. The method of claim 6, wherein:
the dividing of the bin into two bins comprises:
determining that the number of keys in the subset exceeds a threshold; and
in response to determining that the number of keys in the subset exceeds the threshold, dividing the bin into two bins.

8. The method of claim 6, wherein:
the bin is at a first level in a multi-level data structure; and
the dividing of the bin into two bins comprises:
dividing the bin into two bins, each of the two bins being at a second level in the multi-level data structure.

9. The method of claim 1, wherein:
the adding of the key comprises adding the key by a host, the host being connected to a persistent storage device; and
the persistent storage is persistent storage of the host.

10. The method of claim 9, wherein:
the host comprises a non-volatile dual in-line memory module; and
the persistent storage is within the non-volatile dual in-line memory module.

11. The method of claim 1, wherein:
the adding of the key comprises adding the key by a host, the host being connected to a persistent storage device; and
the persistent storage is persistent storage of the persistent storage device.

12. A system, comprising:
a processing circuit; and
memory, operatively connected to the processing circuit and storing instructions that, when executed by the processing circuit, cause the system to perform a method, the method comprising:
adding a key to a sorted set of keys,
the adding comprising:
identifying a bin, in a key map, corresponding to the key;
adding the key to a subset of keys associated with the bin, the subset of keys being stored in persistent memory, and
deleting the key,
wherein:
the adding of the key to the subset of keys associated with the bin comprises adding a first operation to a journal associated with the bin, the journal including one or more operations and one or more keys, each key being associated with a respective operation; and
the deleting of the key comprises replacing, in the journal associated with the bin, the first operation with a second operation, the second operation indicating the deletion of the key.

13. The system of claim 12, wherein the adding of the key to the subset of keys associated with the bin further comprises adding to the journal a value pointer identifying a location of a stored value associated with the key.

14. The system of claim 12, wherein a first portion of the journal is sorted by key.

15. The system of claim 14, wherein a second portion of the journal is in chronological order.

16. A system, comprising:
means for processing; and
memory, operatively connected to the means for processing and storing instructions that, when executed by the means for processing, cause the system to perform a method, the method comprising:
adding a key to a sorted set of keys,
the adding comprising:
identifying a bin, in a key map, corresponding to the key;
adding the key to a subset of keys associated with the bin, the subset of keys being stored in persistent memory, and
deleting the key,
wherein:
the adding of the key to the subset of keys associated with the bin comprises adding a first operation to a journal associated with the bin, the journal including one or more operations and one or more keys, each key being associated with a respective operation; and
the deleting of the key comprises replacing, in the journal associated with the bin, the first operation with a second operation, the second operation indicating the deletion of the key.

* * * * *